(12) United States Patent
Ichiyama

(10) Patent No.: US 7,844,020 B2
(45) Date of Patent: Nov. 30, 2010

(54) TRANSMISSION SYSTEM, TRANSMITTER, RECEIVER, AND TRANSMISSION METHOD

(75) Inventor: Kiyotaka Ichiyama, Tokyo (JP)

(73) Assignee: Advantest Corporation, Tokyo (JP)

( * ) Notice: Subject to any disclaimer, the term of this patent is extended or adjusted under 35 U.S.C. 154(b) by 721 days.

(21) Appl. No.: 11/759,938

(22) Filed: Jun. 8, 2007

(65) Prior Publication Data

US 2008/0304580 A1 Dec. 11, 2008

(51) Int. Cl.
*H04L 7/02* (2006.01)

(52) U.S. Cl. ............... 375/359; 375/289; 375/295; 375/316

(58) Field of Classification Search ............ 375/219, 375/259, 286, 289, 359
See application file for complete search history.

(56) References Cited

U.S. PATENT DOCUMENTS

| | | | | |
|---|---|---|---|---|
| 3,604,857 A | * | 9/1971 | Opferman | 379/165 |
| 4,027,335 A | * | 5/1977 | Miller | 360/40 |
| 4,750,181 A | * | 6/1988 | McDonald et al. | 714/824 |
| 5,056,118 A | * | 10/1991 | Sun | 375/342 |
| 6,114,981 A | * | 9/2000 | Nagata | 341/143 |
| 2009/0103672 A1 | * | 4/2009 | Ichiyama et al. | 375/371 |

FOREIGN PATENT DOCUMENTS

JP 11-219338 8/1999

* cited by examiner

*Primary Examiner*—Shuwang Liu
*Assistant Examiner*—David Huang
(74) *Attorney, Agent, or Firm*—Osha Liang LLP

(57) ABSTRACT

There is provided a transmission system in which a data sequence is transmitted. The transmission system includes a transmitter that generates a transmission signal by converting pieces of data included in the data sequence into data waveforms each of which has (i) a level signal whose signal level is determined by a value of a corresponding one of the pieces of data and (ii) a timing edge indicating a timing to obtain the level signal, and transmits the generated transmission signal, and a receiver that detects the signal level of each of the data waveforms of the received transmission signal at the timing designated by the timing edge of the each data waveform, and outputs a data value corresponding to the detected signal level.

16 Claims, 14 Drawing Sheets

TRANSMISSION SYSTEM, TRANSMITTER, RECEIVER, AND TRANSMISSION METHOD

BACKGROUND

1. Technical Field

The present invention relates to a transmission system, a transmitter, a receiver, and a transmission method. More particularly, the present invention relates to a transmission system, a transmitter, a receiver and a transmission method for transmitting serial data by using a clock signal.

2. Related Art

A transmission system is disclosed which performs wired/wireless/optical transmission of data sequences of serial data by using a clock signal, for example, in Japanese Patent No. 3496501. Such a transmission system for serial data generally includes therein a transmitter and a receiver. The transmitter generates a data signal to be transmitted, from an original data sequence, by using the edge timing of a clock signal, and transmits the generated data signal. The receiver samples the received data signal by using the edge timing of the clock signal which is synchronized with the data signal, to read the original data sequence. Here, when there is a difference in edge timing between the clock signal and the data signal received by the receiver, the read data sequence may have bit errors.

There are mainly two different methods to enable the receiver to obtain a clock signal which is synchronized with the received data signal. According to one of the methods, the clock signal used by the transmitter to generate the data signal is transmitted to the receiver in parallel with the data signal via a transmission path different from the transmission path for the data signal. The receiver uses the received clock signal to sample the received data signal. According to the other method, the transmitter generates the data signal in which the clock signal is embedded, and transmits the generated data signal. The receiver recovers the clock signal from the received data signal, and uses the recovered clock signal to sample the data signal.

The former method has the following problem. It is assumed that successive data signals have the same value. In this case, jitter is generated by the transmission path (hereinafter referred to as "deterministic jitter") in the data signal, but such deterministic jitter is hardly generated in the clock signal which has a regular period. Since the deterministic jitter is generated only in the data signal, the data signal and the clock signal have a difference in timing therebetween, which tends to cause bit errors.

The latter method also has a problem. The receiver has a phase locked loop (PLL) circuit which performs feedback control to cause the edge timing of the data signal received by the receiver to be synchronized with the edge timing of the clock signal recovered by the receiver. The PLL circuit includes therein a phase detector, a loop filter, and a frequency-variable oscillator.

As long as the frequency of the jitter injected to the data signal falls within the loop bandwidth of the loop filter, the phase of the clock signal is varied in accordance with the jitter injected to the data signal. If this is the case, the difference in timing between the data signal and the clock signal is reduced, and the bit errors can be thus prevented from occurring. However, when the frequency of the jitter injected to the data signal takes a value outside the loop bandwidth, the phase of the clock signal can not be varied in accordance with the jitter injected to the data signal. In this case, there is a difference in timing between the data signal and the clock signal, and bit errors may therefore occur.

The PLL circuit of the receiver performs the feedback control so that the edge timing of the recovered clock signal is synchronized with each edge timing of the data signal received by the receiver. Here, it is assumed that the successive logical values of the received data signal are the same, In this case, since no edge is present between these logical values in the data signal, the PLL circuit can not perform the feedback control.

SUMMARY

In view of the above, an advantage of some embodiments of the present invention is to provide a transmission system, a transmitter, a receiver and a transmission method which can solve the above-mentioned problems. This advantage is achieved by combining the features recited in the independent claims. The dependent claims define further effective specific example of the present invention.

A first embodiment of the present invention provides a transmission system in which a data sequence is transmitted. The transmission system includes a transmitter that generates a transmission signal by converting pieces of data included in the data sequence into data waveforms each of which has (i) a level signal whose signal level is determined by a value of a corresponding one of the pieces of data and (ii) a timing edge indicating a timing to obtain the level signal, and transmits the generated transmission signal, and a receiver that detects the signal level of each of the data waveforms of the received transmission signal at the timing designated by the timing edge of the each data waveform, and outputs a data value corresponding to the detected signal level.

Here, all the necessary features of the present invention are not listed in the summary. The sub-combinations of the features may become the invention.

DESCRIPTION OF EXEMPLARY EMBODIMENTS

Hereinafter, one aspect of the present invention will be described through some embodiments. The embodiments do not limit the invention according to the claims, and all the combinations of the features described in the embodiments are not necessarily essential to means provided by aspects of the invention.

Figure 1:
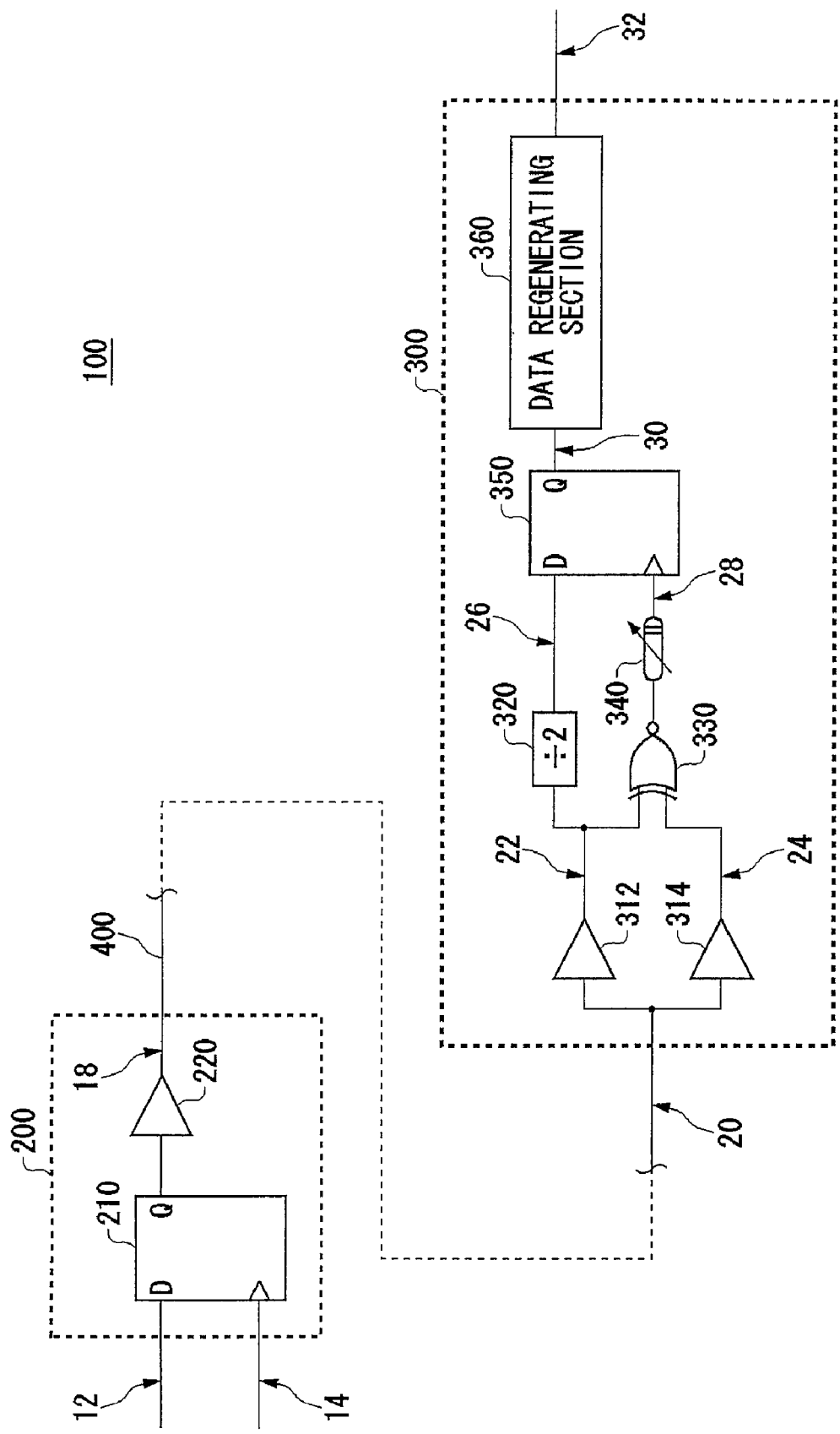
FIG. 1 illustrates an exemplary configuration of a transmission system 100 relating to an embodiment of the present invention.

FIG. 1 illustrates an exemplary configuration of a transmission system 100 relating to an embodiment of the present invention. The transmission system 100 is a system in which a data sequence including binary data values is transmitted. The transmission system 100 includes therein a transmitter 200 and a receiver 300 connected to each other by means of a transmission path 400. The transmitter 200 includes therein a transmission signal generating section 210 and an RZ signal converting section 220. The transmitter 200 generates a transmission signal by converting a plurality of pieces of data, each indicating a logical value of 0 or 1, which are included in an input data sequence into a pulse waveform made up by a plurality of pulses Each of the plurality of pulses has a polarity, with respect to a reference level, which is determined by a value of a corresponding piece of data of the data sequence and has a timing edge indicating a timing to be obtained. The transmitter transmits the generated transmission signal to the receiver 300 via the transmission path 400. The following describes the operation of the transmitter 200 in detail.

Figure 2:
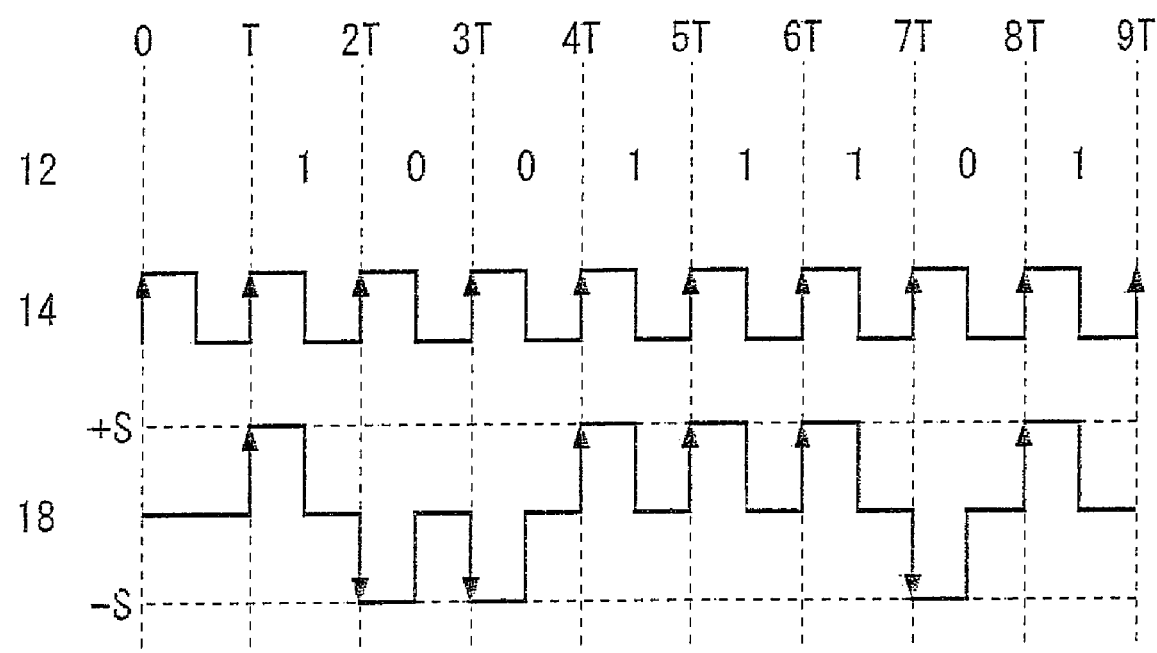
FIG. 2 is a timing chart illustrating an exemplary operation of a transmitter 200 included in the transmission system 100.

FIG. 2 is a timing chart illustrating an exemplary operation of the transmitter 200 included in the transmission system 100. In FIG. 2, the reference numerals on the loft side of the data sequence and the pulse waveforms of the signals are respectively used to identify the data sequence and the pulse waveforms illustrated on the right side. The reference numerals in FIG. 2 are also respectively used to identify the corresponding data sequence and pulse waveforms in FIG. 1. Such a use of the reference numerals applies the rest of the timing charts. When sequentially receiving each piece of data included in a binary data sequence 12 (10011101) which is expressed by using logical values of 0 and 1, at the repetition period of T from a time T, the transmission signal generating section 210 obtains the pieces of data making up the data sequence 12 at the repetition period of T of the transmission clock 14, which is a clock signal having the rising edges at the timings 0, T, 2T, 3T, 4T, . . . . The transmission signal generating section 210 outputs the obtained pieces of data of the data sequence 12 to the RZ signal converting section 220.

The RZ signal converting section 220 transmits, to the receiver 300, the input pieces of data making up the data sequence 12, in the form of the transmission signal 18 which has a pulse waveform with a constant repetition period that is the same as the repetition period of the transmission clock 14. To be more specific, the RZ signal converting section 220 converts data having a logical value of 0 into a pulse which has a level signal whose signal level is "−S" and a timing edge, and converts data having a logical value of 1 into a pulse which has a level signal whose signal level is "+S" and a timing edge. The RZ signal converting section 220 generates the transmission signal 18 having a pulse waveform with a constant repetition period T, based on the pulses generated by the above-described conversions, and outputs the generated transmission signal 18.

Referring to the transmission signal 18, the pulse having the signal level of "−S" has a negative level signal with respect to the reference level, and the pulse having the signal level of "+S" has a positive level signal with respect to the reference level. Therefore, the pulses with the signal levels of "−S" and "+S" have polarities different from each other with respect to the reference level in the transmission signal 18. The above-mentioned timing edge indicates a timing to obtain the level signal of each pulse of the transmission signal 18. In the transmission signal 18, each pulse varies from the reference level to the "−S" or "+S" level at the timing edge, and then goes back to the reference level from the "−S" or "+S" level, as shown in FIG. 2. Here, the transmission signal generating section 210 may also output, to the RZ signal converting section 220, an inverted signal of the signal generated by obtaining the data sequence 12 in accordance with the transmission clock 14, in addition to the signal generated by obtaining the data sequence 12 in accordance with the transmission clock 14. In this case, the RZ signal converting section 220 generates the transmission signal 18 based on the received signal and inverted signal.

The receiver 300 includes therein a positive pulse detecting section 312, a negative pulse detecting section 314, a frequency divider 320, a clock generating section 330, a delay circuit 340, a signal obtaining section 350, and a data regenerating section 360. The receiver 300 outputs a data value, in association with each of the data waveforms included in the received transmission signal, which corresponds to the signal level of the data waveform which is detected at the timing designated by the timing edge of the data waveform. The following describes the operation of the receiver 300 in detail.

Figure 3:
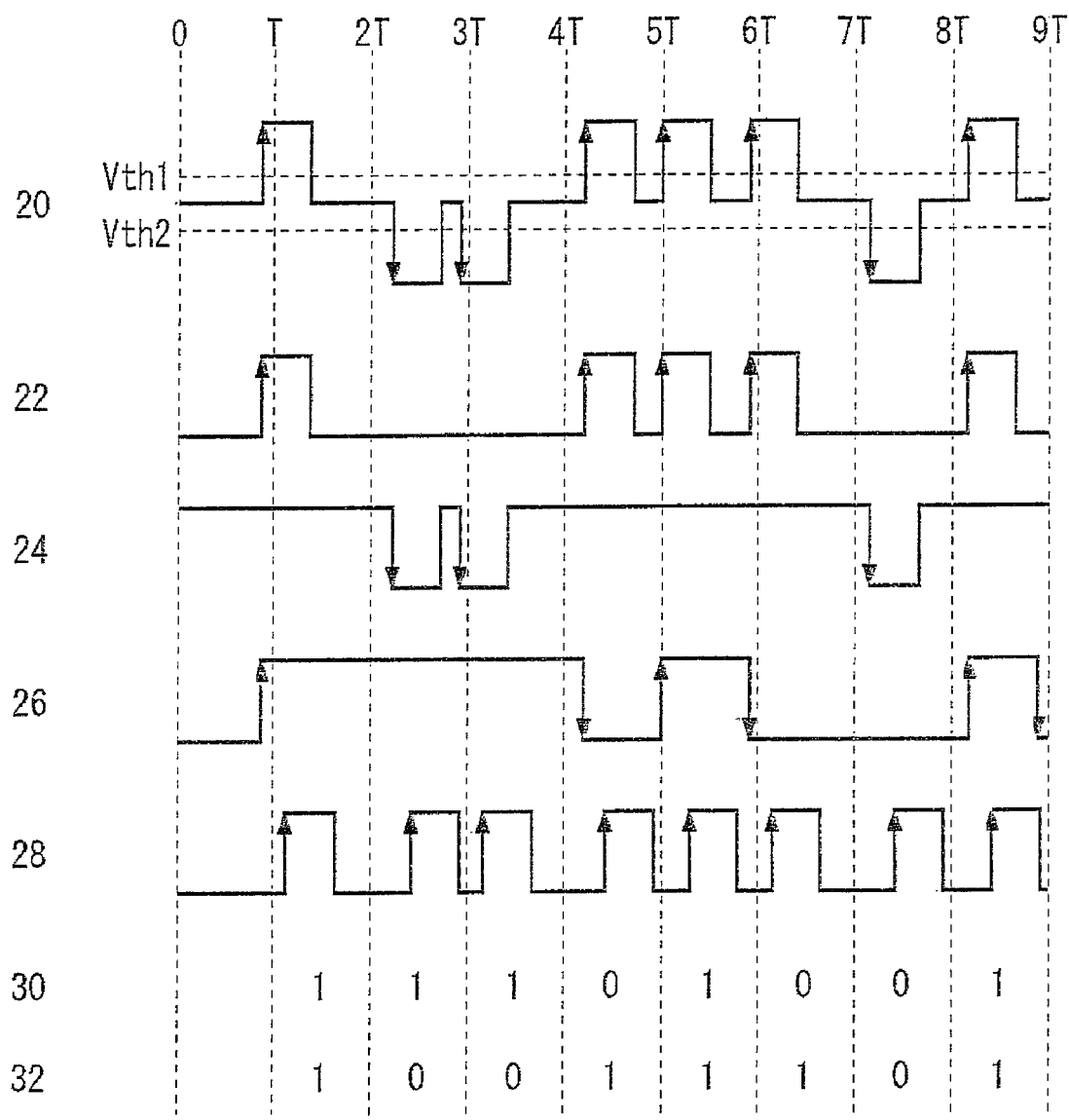
FIG. 3 is a timing chart illustrating an exemplary operation of a receiver 300 included in the transmission system 100.

FIG. 3 is a timing chart illustrating an exemplary operation of the receiver 300 included in the transmission system 100. The transmission signal 18 output from the transmitter 200 is changed into a transmission signal 20 during the transmission to the receiver 300 since jitter is injected to each of the pulses. The transmission signal 20 is input into the positive and negative pulse detecting sections 312 and 314 of the receiver 300. The positive pulse detecting section 312 detects pulses having the signal level on the positive side from the received transmission signal 20, and outputs the detected positive pulses 22. The negative pulse detecting section 314 detects pulses having the signal level on the negative side from the received transmission signal 20, and outputs the detected negative pulses 24.

Specifically speaking, when detecting that the signal level of the input transmission signal is higher than a level "$V_{th1}$" that is higher than the reference level the positive pulse detecting section 312 outputs the positive pulse 22 to the frequency divider 320 and the clock generating section 330. The positive pulse 22 has a binary pulse waveform whose signal level varies from the L level to the H level at the timing of the detection. On the other hand, when detecting that the signal level of the input transmission signal is lower than a level "$V_{th2}$" that is lower than the reference level, the negative pulse detecting section 314 outputs the negative pulse 24 to the clock generating section 330. The negative pulse 24 has a binary pulse waveform whose signal level varies from the H level to the L level at the timing of the detection.

The frequency divider 320 generates a frequency-divided signal 26 by dividing the frequency of the input positive pulse 22 into half, and outputs the generated frequency-divided signal 26 into the signal obtaining section 350. On reception of the positive and negative pulses 22 and 24, the clock generating section 330 detects the signal levels of the received pulses, at the timings designated by the timing edges of a pulse that is substantially synchronized with the positive and negative pulses 22 and 24. The clock generating section 330 obtains a negation of a logical XOR between the detected signal levels, generates a reception clock based on the obtained logical value, and outputs the generated reception clock to the delay circuit 340.

The delay circuit 340 is provided to enable the frequency-divided signal 26 to be obtained at the timings indicated by the reception clock. The delay circuit 340 delays the input reception clock by, for example, a quarter the period (¼T) or half the period (½T), to generate a reception clock 28 which assures a sufficient setup/hold time to the frequency-divided signal 26, and outputs the generated reception clock 28 to the signal obtaining section 350. Here, the jitter which is injected to the timing at which each pulse of the reception clock 28 rises is substantially the same as the jitter which is injected to a corresponding one of the pulses of the transmission signal 20. The signal obtaining section 350 obtains the frequency-divided signal 26 at the timings designated by the reception clock 28, detects the signal level of the frequency-divided signal 26 at the timings designated by the reception clock 28, and outputs data values corresponding to the detected signal levels.

To be specific, when the signal level of the frequency-divided signal 26 which is obtained at the timing designated by the reception clock 28 is the L level, the signal obtaining section 350 outputs the logical value of 0 at the designated timing to the data regenerating section 360. Similarly, when the signal level of the frequency-divided signal 26 which is obtained at the timing designated by the reception clock 28 is the H level the signal obtaining section 350 outputs the logical value of 1 at the designated timing to the data regenerating section 360. In the above-described manner, the signal obtaining section 350 outputs a binary data sequence 30 (11101001) corresponding to the obtained signal levels of the frequency-divided signal 26, to the data regenerating section 360. Here the timing designated by the reception clock 28 indicates, for example, a timing at which each of the pulses of the reception clock 28 rises.

The data regenerating section 360 generates a regenerated data sequence 32 by regenerating the data sequence 12 from the input data sequence 30. To be specific, the data regenerating section 360 generates the regenerated data sequence 32 (10011101) by assigning the logical value of 1 to the data of the regenerated data sequence 32 for the cycle which corresponds to the initial piece of data of the input data sequence 30 and assigning a logical XOR between the logical value of data of the data sequence 30 for a certain cycle and the logical value of the data of the data sequence 30 for the immediately previous cycle to the data of the regenerated data sequence 32 for the certain cycle. The data converting section 230 outputs the generated regenerated data sequence 32 to a device external to the receiver 300.

As discussed above in the description of the transmission system 100, the transmitter 200 converts the input data sequence 12, which is made up by logical values 0 and 1, into the transmission signal 18, which has a pulse waveform including pulses of different polarities with respect to the reference level, and transmits the transmission signal 18 to the receiver 300. Here, a case is assumed where the transmission signal 18 is injected with jitter and changed into the transmission signal 20 during the transmission from the transmitter 200 to the receiver 300. Even in this case, since the signal obtaining section 350 obtains the frequency-divided signal 26 at the timings designated by the reception clock 28 each pulse of which is injected with the same jitter as the corresponding pulse of the transmission signal 20, the signal obtaining section 350 can accurately detect the signal level of each period of the frequency-divided signal 26. Therefore, the receiver 300 can minimize the bit errors caused by the jitter. As a result, the receiver 300 can accurately regenerate the regenerated data sequence 32, which is the same as the data sequence 12, based on the data value corresponding to the detected signal level of each period.

Figure 4:
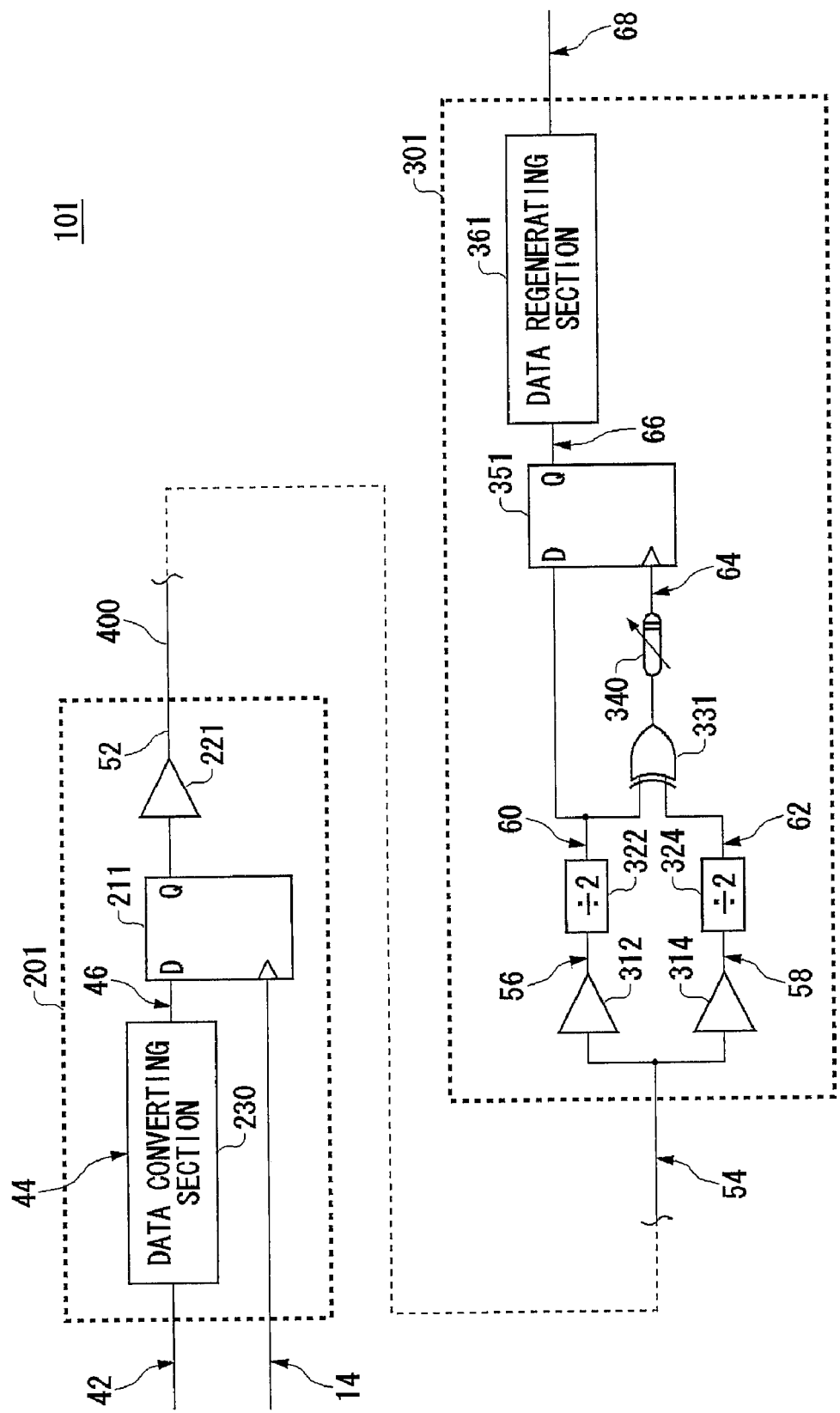
FIG. 4 illustrates an exemplary configuration of a transmission system 101 relating to another embodiment of the present invention.

FIG. 4 illustrates an exemplary configuration of a transmission system 101 relating to another embodiment of the present invention. The transmission system 101 includes the same constituents and uses the same pulse waveforms for the signals to transmit, as the above-described transmission system 100. Such constituents and signals are assigned the same reference numerals as in FIG. 1 and not explained here. The transmission system 101 includes therein a transmitter 201 and a receiver 301 connected to each other by means of the transmission path 400. The transmitter 201 includes therein a data converting section 230, a transmission signal generating section 211, and an RZ signal converting section 221. The transmitter 201 converts the input data sequence into a converted data sequence, generates a transmission signal by converting each of the pieces of data making up the converted data sequence into a data waveform which has a level signal whose signal level is determined by the value of the data and a timing edge indicating a timing to obtain the level signal, and transmits the generated transmission signal via the transmission path 400 to the receiver 301. The following describes the operation of the transmitter 201 in detail.

Figure 5:
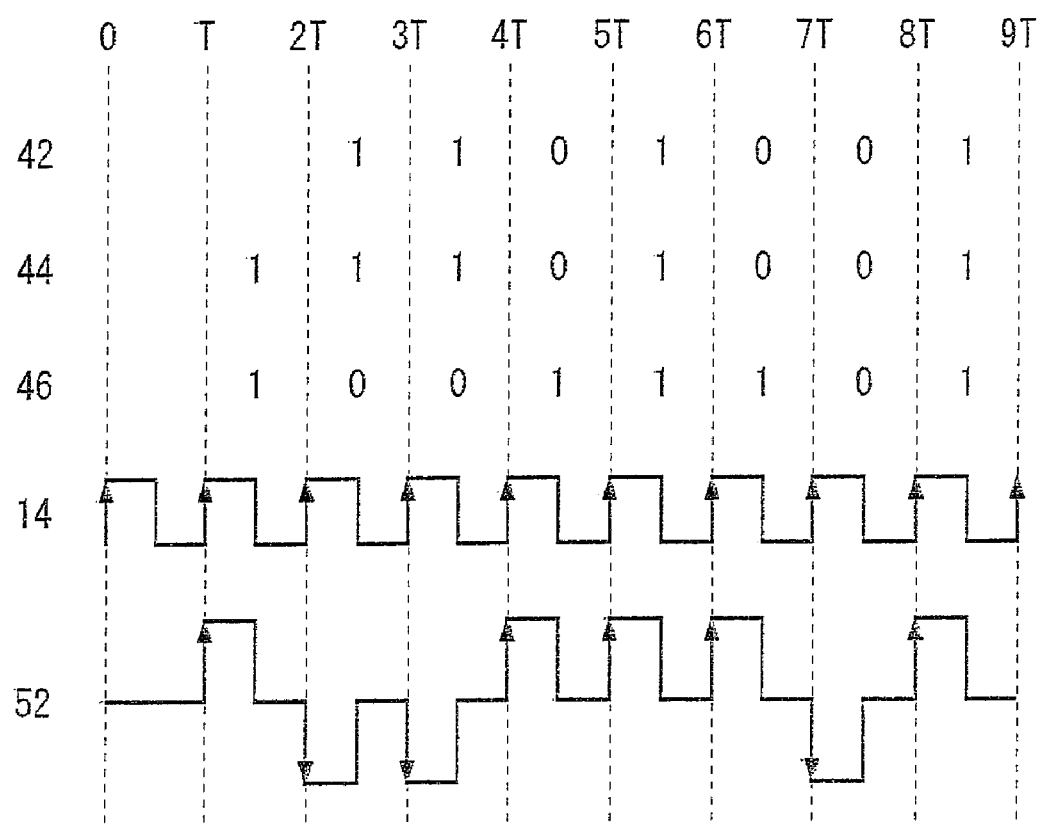
FIG. 5 is a timing chart illustrating an exemplary operation of a transmitter 201 included in the transmission system 101.

FIG. 5 is a timing chart illustrating an exemplary operation of the transmitter 201 included in the transmission system 101. On reception of a binary data sequence 42 (1101001) which is expressed by using the logical values 0 and 1 and is to be transmitted from the transmitter 201, the data converting section 230 of the transmitter 201 generates a data sequence 44 (11101001) by injecting data having the logical value of 1 at the start of the received data sequence 42. The data converting section 230 then generates a converted data sequence 46 (10011101) by assigning the logical value of 1 to the data or the converted data sequence 46 for a cycle corresponding to the initial piece of data of the generated data sequence 44, and assigning the logical XOR between the logical value of the data of the data sequence 44 for a certain cycle and the logical value of the data of the data sequence 44 for the immediately previous cycle to the data of the data sequence 46 for the certain cycle. The data converting section 230 outputs the generated converted data sequence 46 to the transmission signal generating section 211.

When receiving the pieces of data making up the converted data sequence 46 and the transmission clock 14, the transmission signal generating section 211 sequentially outputs each of the pieces of data making up the converted data sequence 46 at the repetition period of T, to the RZ signal converting section 221, at an interval equal to the repetition period of the transmission clock 14. The RZ signal converting section 221 transmits, in the form of a transmission signal 52, the input pieces of data making up the converted data sequence 46, to the receiver 301. To be specific, when sequentially receiving each of the pieces of data making up the data sequence 12 at the constant repetition period of T from the time T, the RZ signal converting section 221 converts data having the logical value of 0 into a pulse which has a level signal whose signal level is "−S" and a timing edge, and converts data having the logical value of 1 into a pulse which has a level signal whose signal level is "+S" and a timing edge. The RZ signal converting section 221 generates the transmission signal 52 which has a pulse waveform with a constant repetition period of T based on the pulses generated by the above-described conversions, and outputs the generated transmission signal 52.

Referring to the transmission signal 52, the pulse having a signal level of "−S" has a negative level signal with respect to the reference level, and the pulse having a signal level of "+S" has a positive level signal with respect to the reference level. Therefore, the pulses having the "−S" and "+S" levels have polarities different from each other with respect to the reference level, in the transmission signal 52. The above-mentioned timing edge indicates a timing to obtain the level signal of each pulse of the transmission signal 52. In the transmission signal 52, each pulse varies from the reference level to the "−S" or "+S" signal level at the timing edge, and then goes back to the reference level from the "−S" or "+S" signal level, as shown in FIG. 5.

The receiver 301 includes therein the positive pulse detecting section 312, the negative pulse detecting section 314, a positive frequency divider 322, a negative frequency divider 324, a clock generating section 331, the delay circuit 340, a signal obtaining section 351, and a data regenerating section 361. In accordance with each of the data waveforms of the received transmission signal, the receiver 301 outputs a data value corresponding to the signal level of the data waveform which is detected at the timing designated by the timing edge of the data waveform. The following describes the operation of the receiver 301 in detail.

Figure 6:
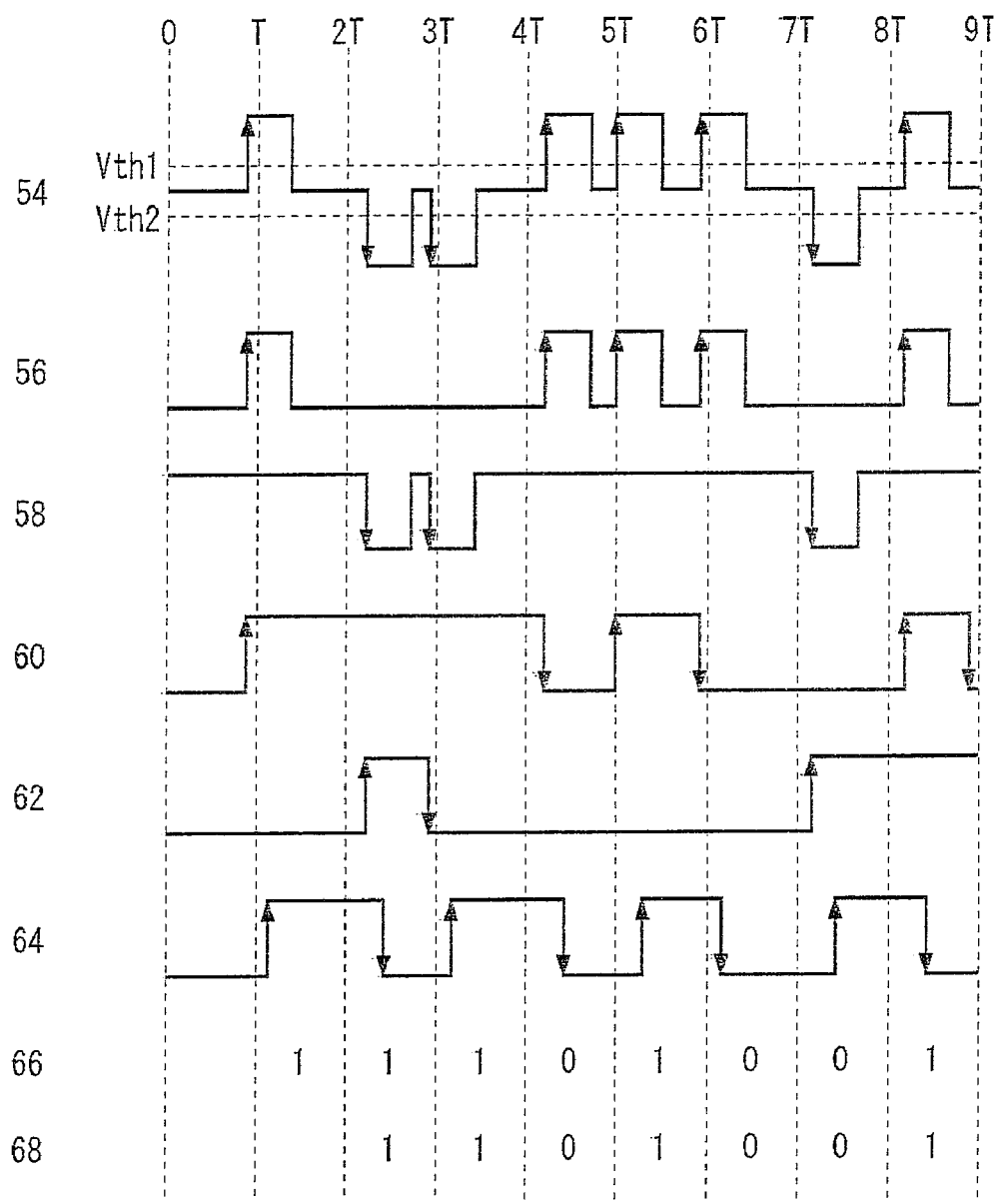
FIG. 6 is a timing chart illustrating an exemplary operation of a receiver 301 included in the transmission system 101.

FIG. 6 is a timing chart illustrating an exemplary operation of the receiver 301 included in the transmission system 101. The transmission signal 52 output from the transmitter 201 is changed into a transmission signal 54 during the transmission to the receiver 301 since jitter is injected to each pulse. The transmission signal 54 is input into the positive and negative pulse detecting sections 312 and 314 of the receiver 301. The positive pulse detecting section 312 detects pulses from the received transmission signal 54 which have the signal level on the positive side, and outputs the detected positive pulses 56 to the positive frequency divider 322. The negative pulse detecting section 314 detects pulses from the received transmission signal 54 which have the signal level on the negative side, and outputs the detected negative pulses 58 to the negative frequency divider 324.

The positive frequency divider 322 generates a positive frequency-divided signal 60 by dividing the frequency of the input positive pulse 56 into half, and outputs the generated positive frequency-divided signal 60 to the clock generating section 331 and the signal obtaining section 351. The negative frequency divider 324 generates a negative frequency-divided signal 62 by dividing the frequency of the input negative pulse 58 into half, and outputs the generated negative frequency-divided signal 62 to the clock generating section 331. The clock generating section 331 obtains a logical XOR between the positive and negative frequency-divided signals 60 and 62 in order to generate a reception clock whose signal level varies at varying points of the signal levels in the pulses of the positive and negative frequency-divided signals 60 and 62, and outputs the generated reception clock to the delay circuit 340.

The delay circuit 340 delays the input reception clock by, for example, a quarter the period (¼T) or a half the period (½T), to generate a reception clock 64, and outputs the generated reception clock 64 to the signal obtaining section 351. Here, the jitter which is injected to the timing at which each pulse of the reception clock 64 rises or falls is substantially the same as the jitter which is injected to a corresponding one of the pulses of the transmission signal 54. The signal obtaining section 351 obtains the positive frequency-divided signal 60 at the timings designated by the reception clock 64, detects the signal level of the positive frequency-divided signal 60 at the timings designated by the reception clock 64, and outputs data values corresponding to the detected signal levels.

To be specific, when the signal level of the positive frequency-divided signal 60 which is obtained at the timing designated by the reception clock 64 is the L level, the signal obtaining section 351 outputs the logical value of 0 at the designated timing to the data regenerating section 361. Similarly, when the signal level of the positive frequency-divided signal 60 which is obtained at the timing designated by the reception clock 64 is the H level, the signal obtaining section 351 outputs the logical value of 1 at the designated timing to the data regenerating section 361. In the above-described manner, the signal obtaining section 351 outputs a binary data sequence 66 (11101001) corresponding to the obtained signal levels of the positive frequency-divided signal 60, to the data regenerating section 360. Here, the timing designated by the reception clock 64 indicates a timing at which each of the pulses of the reception clock 64 rises and falls.

The data regenerating section 361 generates a regenerated data sequence 68 by regenerating the data sequence 42 from the input data sequence 66. To be specific the data regenerating section 360 generates the regenerated data sequence 68 (1101001) by removing the initial piece of data having the logical value of 1 from the input data sequence 66. The data regenerating section 361 outputs the generated regenerated data sequence 68 to a device external to the receiver 301.

As discussed in the above description of the transmission system 101, the transmitter 201 converts the input data sequence 42, which is made up by logical values 0 and 1, into the transmission signal 52 which has a pulse waveform including the pulses of different polarities with respect to the reference level and having a constant repetition period, and transmits the transmission signal 52 to the receiver 301. Here, a case is assumed where the transmission signal 52 is injected with jitter and thus changed into the transmission signal 54 during the transmission from the transmitter 201 to the receiver 301. Even in this case, since the signal obtaining section 351 obtains the positive frequency-divided signal 60 at the timings designated by the reception clock 64 each pulse of which has the same jitter as the corresponding pulse of the transmission signal 54, the signal obtaining section 351 can accurately detect the signal level of each period of the positive frequency-divided signal 60. Therefore, the receiver 301 can minimize the bit errors caused by the jitter. As a result, the receiver 301 can accurately regenerate the regenerated data sequence 68 which is the same as the data sequence 42 based on the data value corresponding to the detected signal level of each period.

Figure 7:
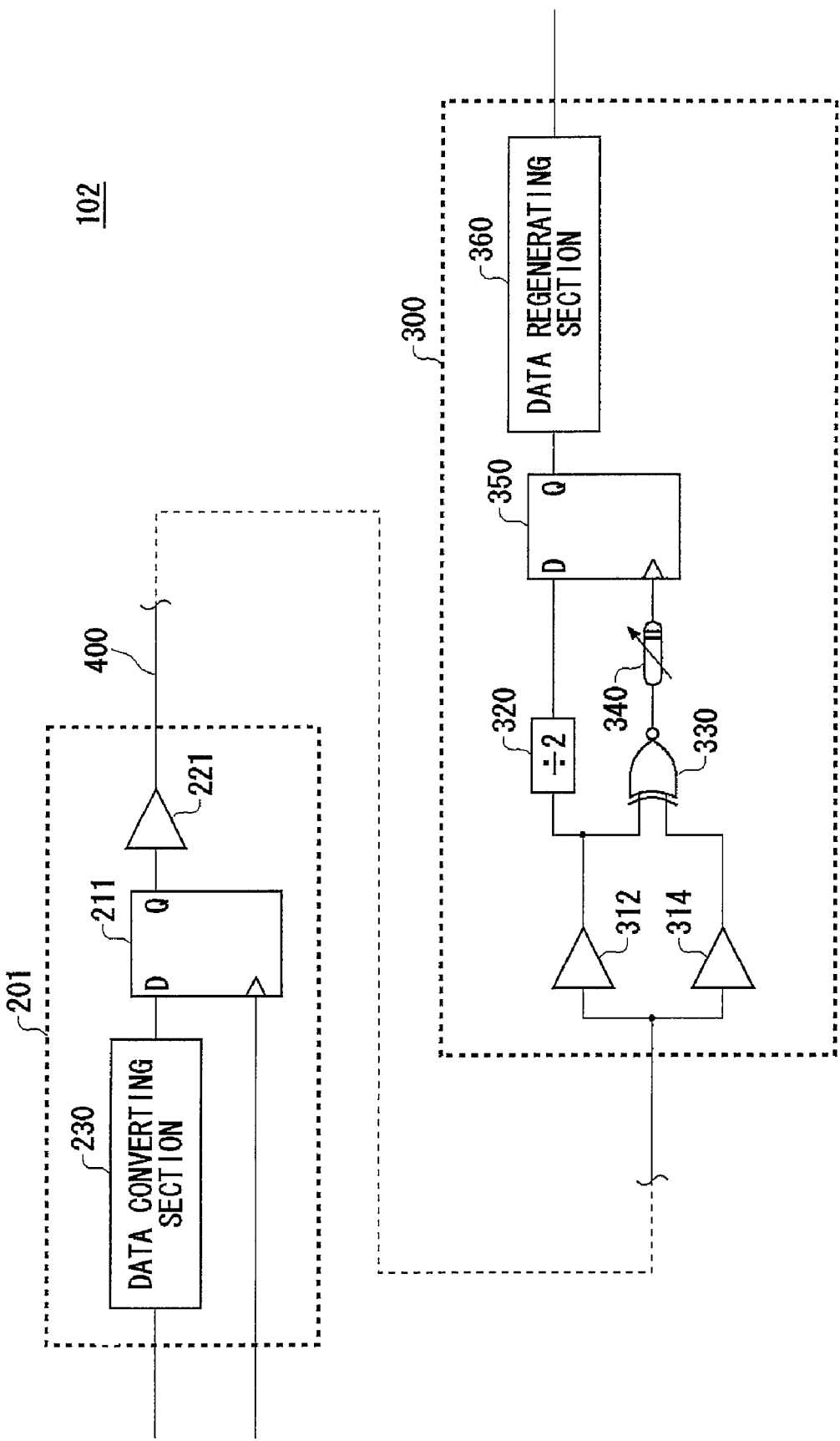
FIG. 7 illustrates an exemplary configuration of a transmission system 102 relating to another embodiment of the present invention.

FIG. 7 illustrates an exemplary configuration of a transmission system 102 relating to another embodiment of the present invention. The transmission system, 102 includes therein the transmitter 201 which is included in the transmission system 101, and the receiver 300 which is included in the transmission system 100. The transmitter 201 and the receiver 300 are connected to each other by using the transmission path 400. The configurations and effects of the transmitter 201 and the receiver 300 are described in the earlier part and not repeated here. The transmission system 102 minimizes the bit errors caused by the jitter similarly to the above-described transmission systems 100 and 101, thereby accurately regenerating the regenerated data sequence which is the same as the input binary data sequence.

Figure 8:
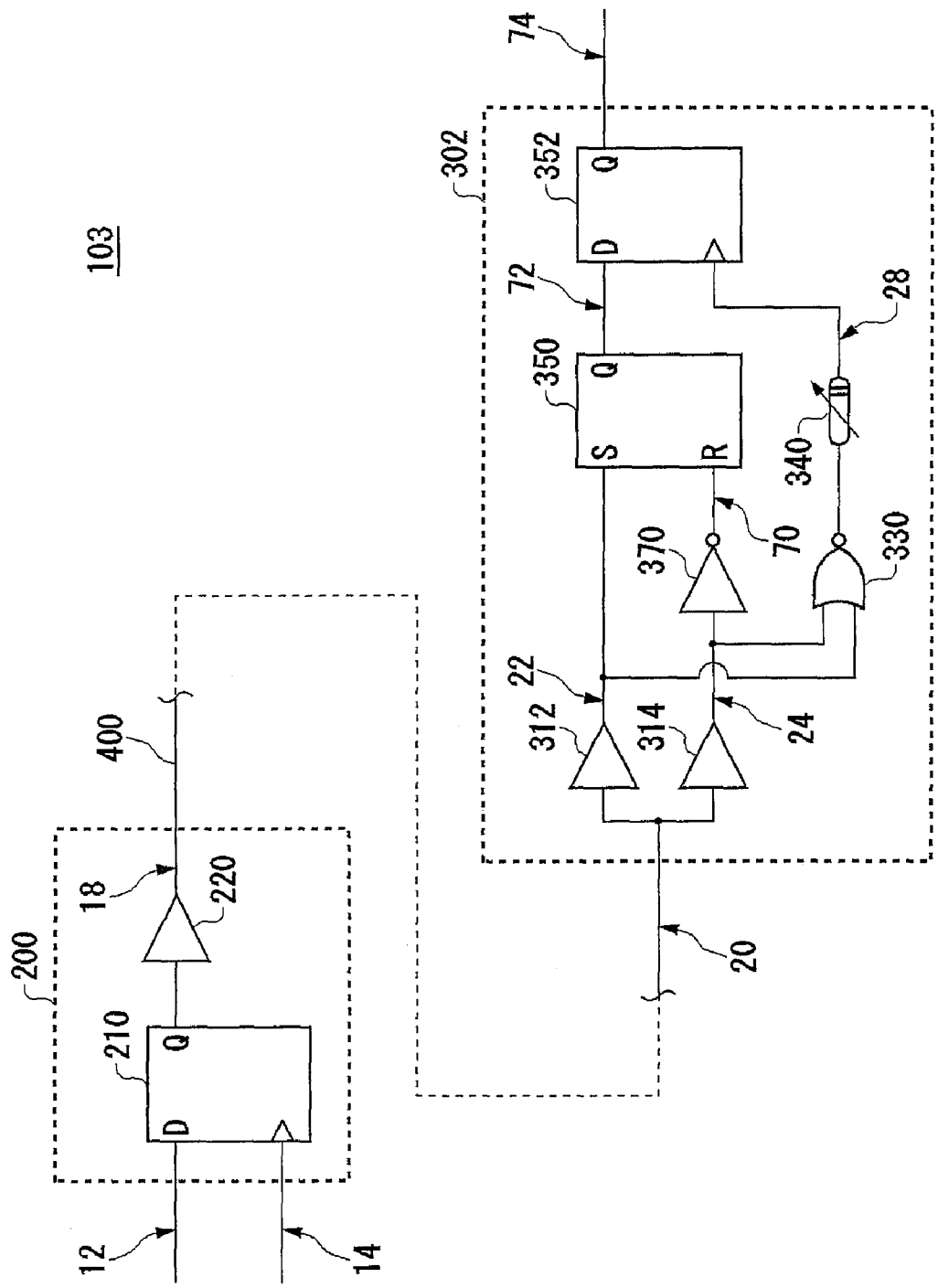
FIG. 8 illustrates an exemplary configuration of a transmission system 103 relating to another embodiment of the present invention.

FIG. 8 illustrates an exemplary configuration of a transmission system 103 relating to another embodiment of the present invention. The transmission system 103 has the same constituents and uses the same pulse waveforms for the signals to transmit, as the above-described transmission systems 100 to 102. Such constituents and signals are assigned the same reference numerals as in FIGS. 1, 4 and 7 and are not explained here. The transmission system 103 includes therein the transmitter 200 and a receiver 302 connected to each other by means of the transmission path 400. The configuration and effects of the transmitter 200 are discussed in the earlier part and not repeated here. The transmitter 200 transmits the transmission signal 18 to the receiver 302 via the transmission path 400. Here, the transmission signal 18 is generated by converting the pieces of data included in the binary data sequence 12 (10011101), which is for example the same as the above-mentioned data sequence 12, into a pulse waveform made up by a plurality of pulses each of which has a polarity, with respect to the reference level, determined by the value of a corresponding one of the pieces of data of the data sequence 12, and has a timing edge indicating a timing to be obtained.

The receiver 302 includes therein the positive pulse detecting section 312, the negative pulse detecting section 314; the clock generating section 330, the delay circuit 340, a signal obtaining section 352, an inversion amplifier 370, and an SR flip-flop 380. The following describes the operation of the receiver 302 in detail.

Figure 9:
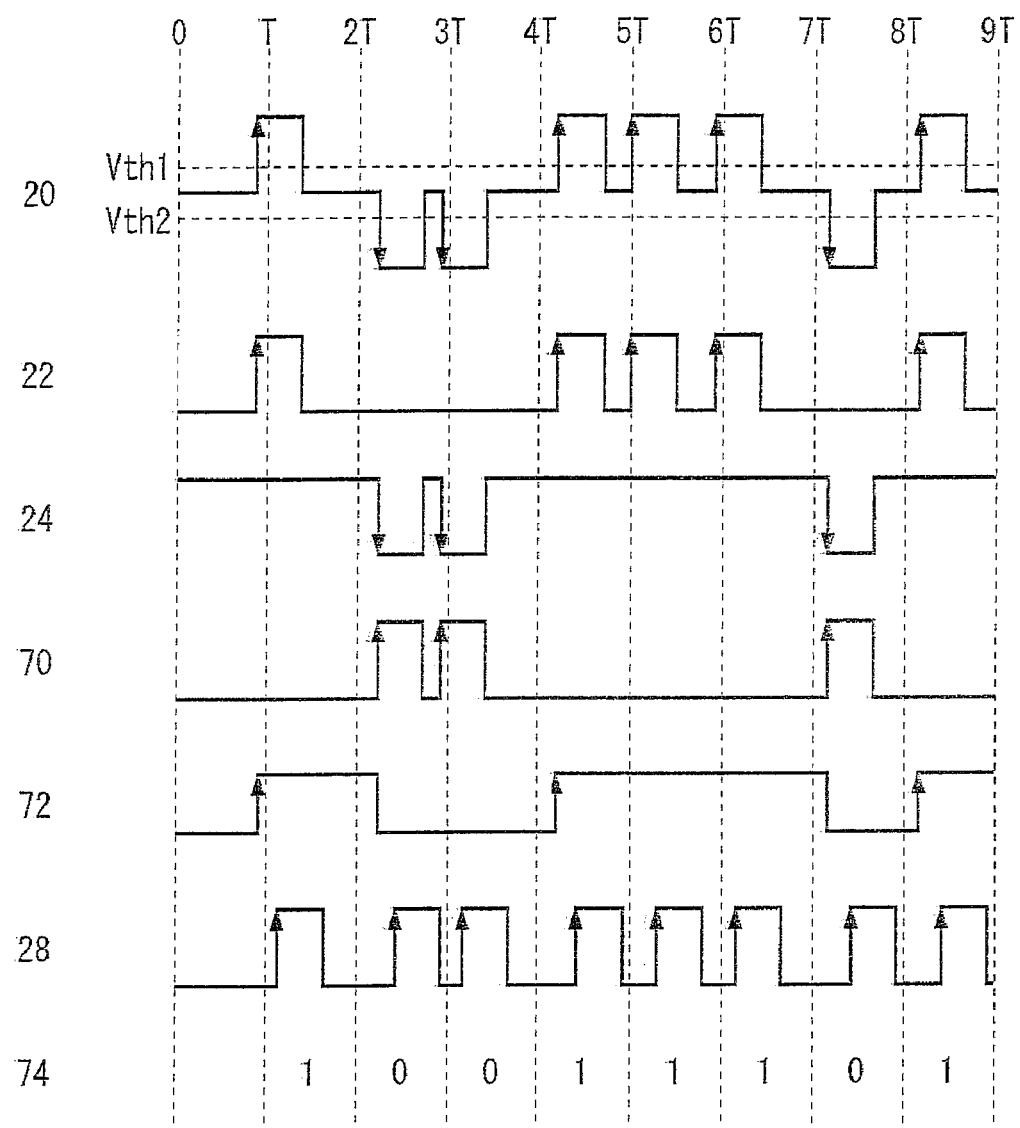
FIG. 9 is a timing chart illustrating an exemplary operation of a receiver 302 included in the transmission system 103.

FIG. 9 is a timing chart illustrating an exemplary operation of the receiver 302 included in the transmission system 103. Referring to the transmission system 103, the transmission signal 18 output from the transmitter 200 is changed into the transmission signal 20 during the transmission to the receiver 300 since jitter is injected to each pulse. The transmission signal 20 is input into the positive and negative pulse detecting sections 312 and 314 of the receiver 302. The positive pulse detecting section 312 detects pulses from the received transmission signal 20 which have the signal level on the positive side, and outputs the detected positive pulses 22 to the clock generating section 330 and SR flip-flop 380. The negative pulse detecting section 314 detects pulses from the received transmission signal 20 which have the signal level on the negative side, and outputs the detected negative pulses 24 to the clock generating section 330 and a negation logic circuit 370. The negation logic circuit 370 inverts the input negative pulses 24, and outputs the inverted negative pulses 24 to the SR flip-flop 380.

The SR flip-flop 380 is set by the positive pulses 22 received from the positive pulse detecting section 312, and reset by the negative pulses 24 received from the negative pulse detecting section 314, to generate an SR signal 72, and outputs the generated SR signal 72 to the signal obtaining section 352. The signal obtaining section 352 obtains the SR signal 72 at the timings designated by the reception clock 28, detects the signal level of the SR signal 72 at the timings designated by the reception clock 28, and outputs data values corresponding to the detected signal levels.

To be specific, when the signal level of the SR signal 72 which is obtained at the timing designated by the reception clock 28 is the L level, the signal obtaining section 352 outputs data having the logical value of 0 at the designated timing. Similarly, when the signal level of the SR signal 72 which is obtained at the timing designated by the reception clock 28 is the H level, the signal obtaining section 352 outputs data having the logical value of 1 at the designated timing. Here, the timing designated by the reception clock 28 indicates a timing, for example, at which each pulse of the reception clock 28 rises. In the above-described manner, the signal obtaining section 352 generates a binary regenerated data sequence 74 (10011101) corresponding to the obtained signal levels of the SR signal 72. The signal obtaining section 352 outputs the generated regenerated data sequence 74 to a device external to the receiver 302.

As described above, the transmission system 103 can accurately regenerate the regenerated data sequence 74 which is the same as the input binary data sequence 12 without causing bit errors, similarly to the transmission systems 100 to 102 described above.

Figure 10:
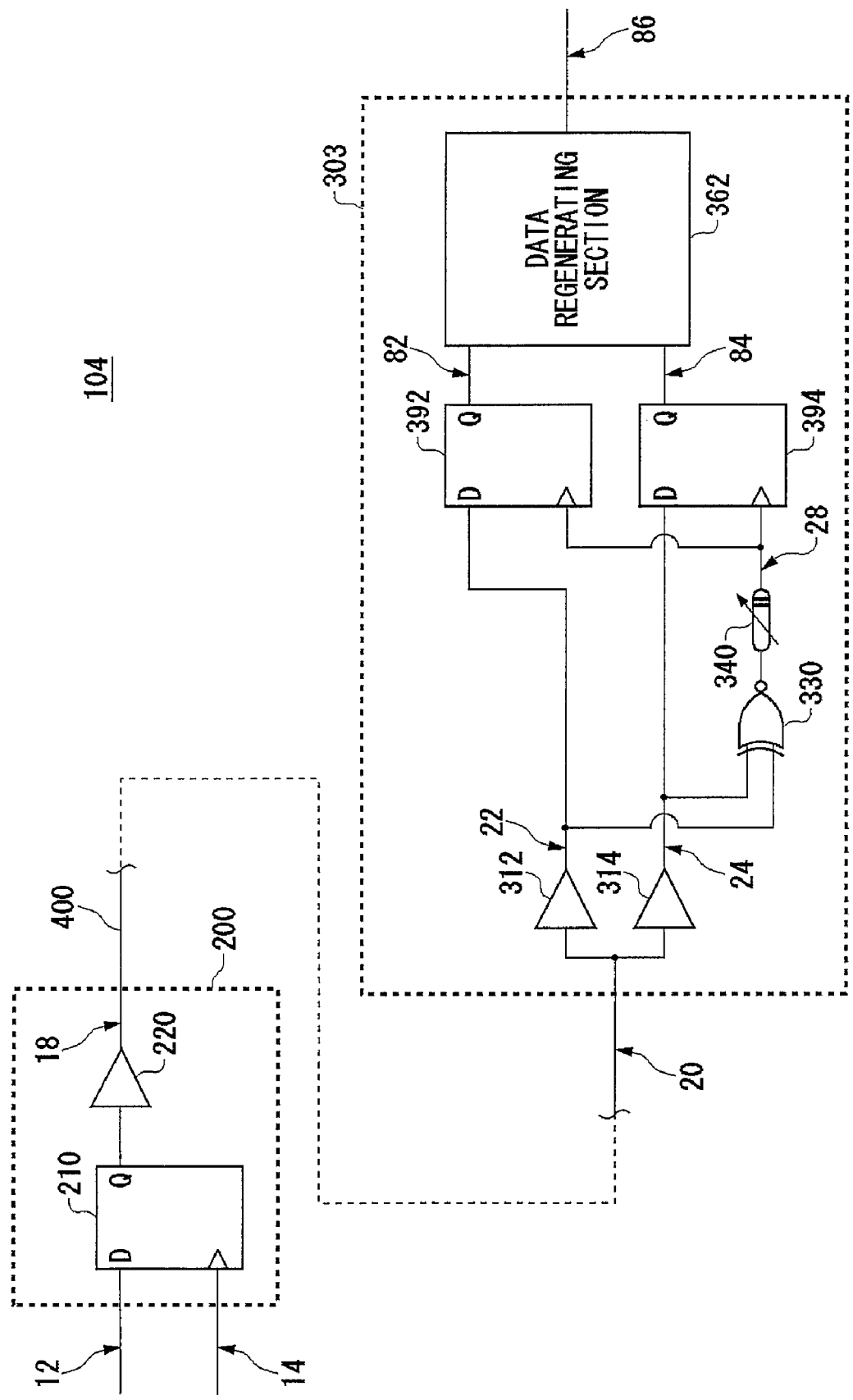
FIG. 10 illustrates an exemplary configuration of a transmission system 104 relating to another embodiment of the present invention.

FIG. 10 illustrates an exemplary configuration of a transmission system 104 relating to another embodiment of the present invention. The transmission system 104 includes the same constituents and uses the same pulse waveforms for the signals to transmit, as the transmission systems 100 to 103. Such constituents and signals are assigned the same reference numerals as in FIGS. 1, 4, 7 and 8 and not explained here. The transmission system 104 includes therein the transmitter 200 and a receiver 303 connected to each other by means of the transmission path 400. The configuration and effects of the transmitter 200 are discussed in the earlier part and not repeated here. The transmitter 200 transmits the transmission signal 18 to the receiver 303 via the transmission path 400. Here, the transmission signal 18 is generated by converting, when the binary data sequence 12 (10011101) which is for example the same as the above-mentioned data sequence 12 is input into the transmitter 200, the pieces of data included in the input data sequence 12 into a pulse waveform made up by a plurality of pulses each of which has a polarity, with respect to the reference level, determined by the value of a corresponding piece of data of the data sequence 12 and has a timing edge indicating a timing to be obtained.

The receiver 303 includes therein the positive pulse detecting section 312, the negative pulse detecting section 314, the clock generating section 330, the delay circuit 340, a positive pulse obtaining section 392, a negative pulse obtaining section 394, and a data regenerating section 362. The following describes the operation of the receiver 303 in detail.

Figure 11:
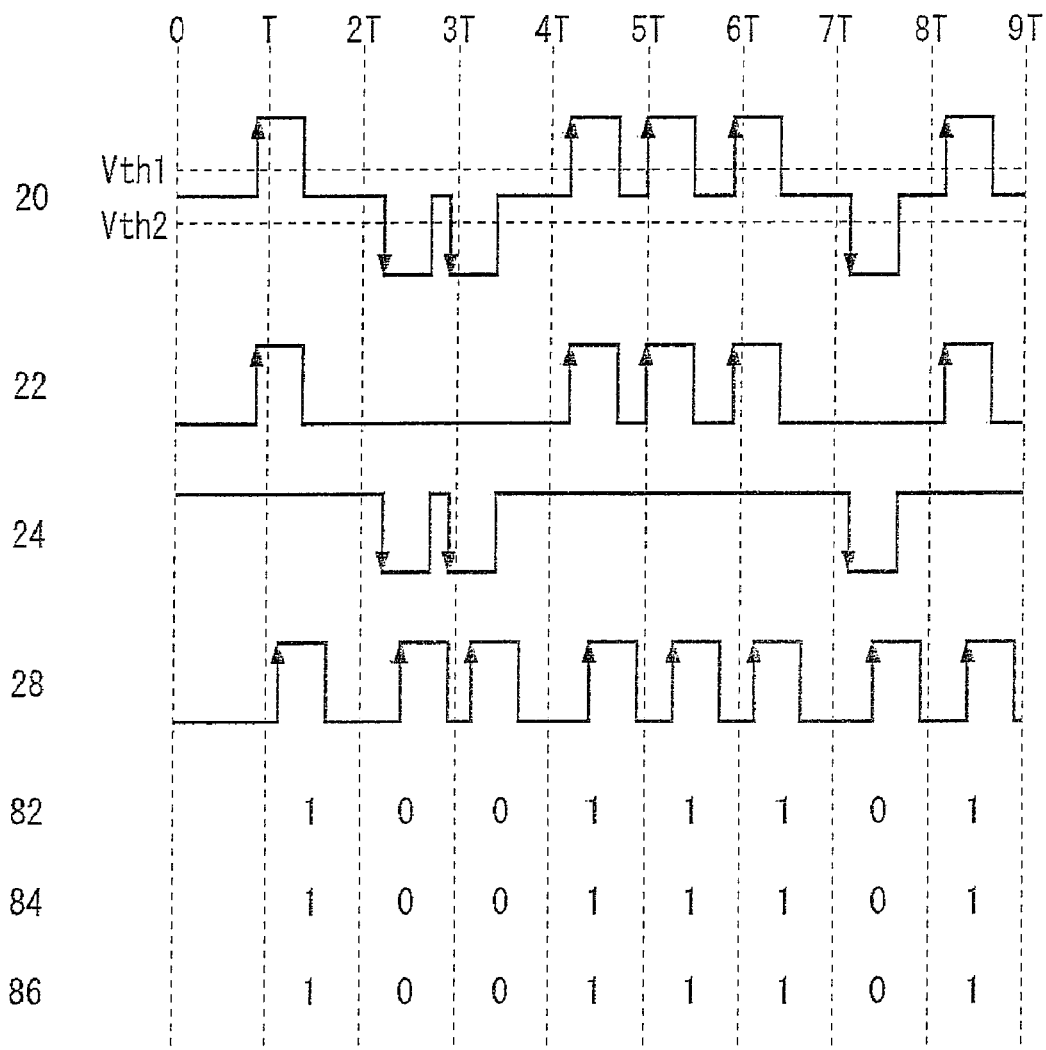
FIG. 11 is a timing chart illustrating an exemplary operation of a receiver 303 included in the transmission system 104.

FIG. 11 is a timing chart illustrating an exemplary operation of the receiver 303 included in the transmission system 104. Referring to the transmission system 104, the transmission signal 18 output from the transmitter 200 is changed into the transmission signal 20 during the transmission to the receiver 303 since jitter is injected to each pulse. The transmission signal 20 is input into the positive and negative pulse detecting sections 312 and 314 of the receiver 303. The positive pulse detecting section 312 detects pulses from the received transmission signal 20 which have the signal level on the positive side, and outputs the detected positive pulses 22 to the clock generating section 330 and positive pulse obtaining section 392. The negative pulse detecting section 314 detects pulses from the received transmission signal 20 which have the signal level on the negative side, and outputs the detected negative pulses 24 to the clock generating section 330 and the negative pulse obtaining section 394.

The positive pulse obtaining section 392 obtains the positive pulses 22 output from the positive pulse detecting section 312 at the timings designated by the reception clock 28, detects the signal levels of the positive pulses 22 at the timings designated by the reception clock 28, and outputs data values corresponding to the detected signal levels.

To be specific, when the signal level of the positive pulse 22 which is obtained at the timing designated by the reception clock 28 is the L level, the positive pulse obtaining section 392 outputs data having the logical value of 0 at the designated timing. Similarly, when the signal level of the positive pulse 22 which is obtained at the timing designated by the reception clock 28 is the H level, the positive pulse obtaining section 392 outputs data having the logical value of 1 at the designated timing. Here, the timing designated by the reception clock 28 indicates, for example, a timing at which each of the pulses of the reception clock 28 rises. In the above-described manner, the positive pulse obtaining section 392 generates a binary positive data sequence 82 (10011101) corresponding to the obtained signal levels of the positive pulses 22. The positive pulse obtaining section 392 outputs the generated positive data sequence 82 to the data regenerating section 362.

The negative pulse obtaining section 394 operates in a similar manner to the above-described positive pulse obtaining section 392. To be specific, the negative pulse obtaining section 394 obtains the negative pulses 24 output from the negative pulse detecting section 314 at the timings designated by the reception clock 28, detects the signal levels of the positive pulses 22 at the timings designated by the reception clock 28, and generates a binary negative data sequence 84 (10011101) corresponding to the detected signal levels. The negative pulse obtaining section 394 outputs the generated negative data sequence 84 to the data regenerating section 362.

The data regenerating section 362 generates a regenerated data sequence 86 (10011101) which is the same data sequence as the data sequence 12, based on the positive and negative data sequences 82 and 84 input thereto. To be more specific, the data regenerating section 362 compares, in terms of each cycle, the respective pieces of data between the positive and negative data sequences 82 and 84. When the compared pieces of data match each other, the data regenerating section 362 generates the same data as the matching pieces of data. In this way, the data regenerating section 362 generates the regenerated data sequence 86. The data regenerating section 362 outputs the generated regenerated data sequence 86 to a device external to the receiver 303. When the compared pieces of data do not match each other between the positive and negative data sequences 82 and 84, the data regenerating section 362 may stop outputting the regenerated data sequence 86, or may output error information data which is different from the regenerated data sequence 86, for example.

As described above, the transmission system 104 can accurately regenerate the regenerated data sequence 86 which is the same as the input binary data sequence 12 without causing bit errors, similarly to the transmission systems 100 to 103 described above.

Figure 12:
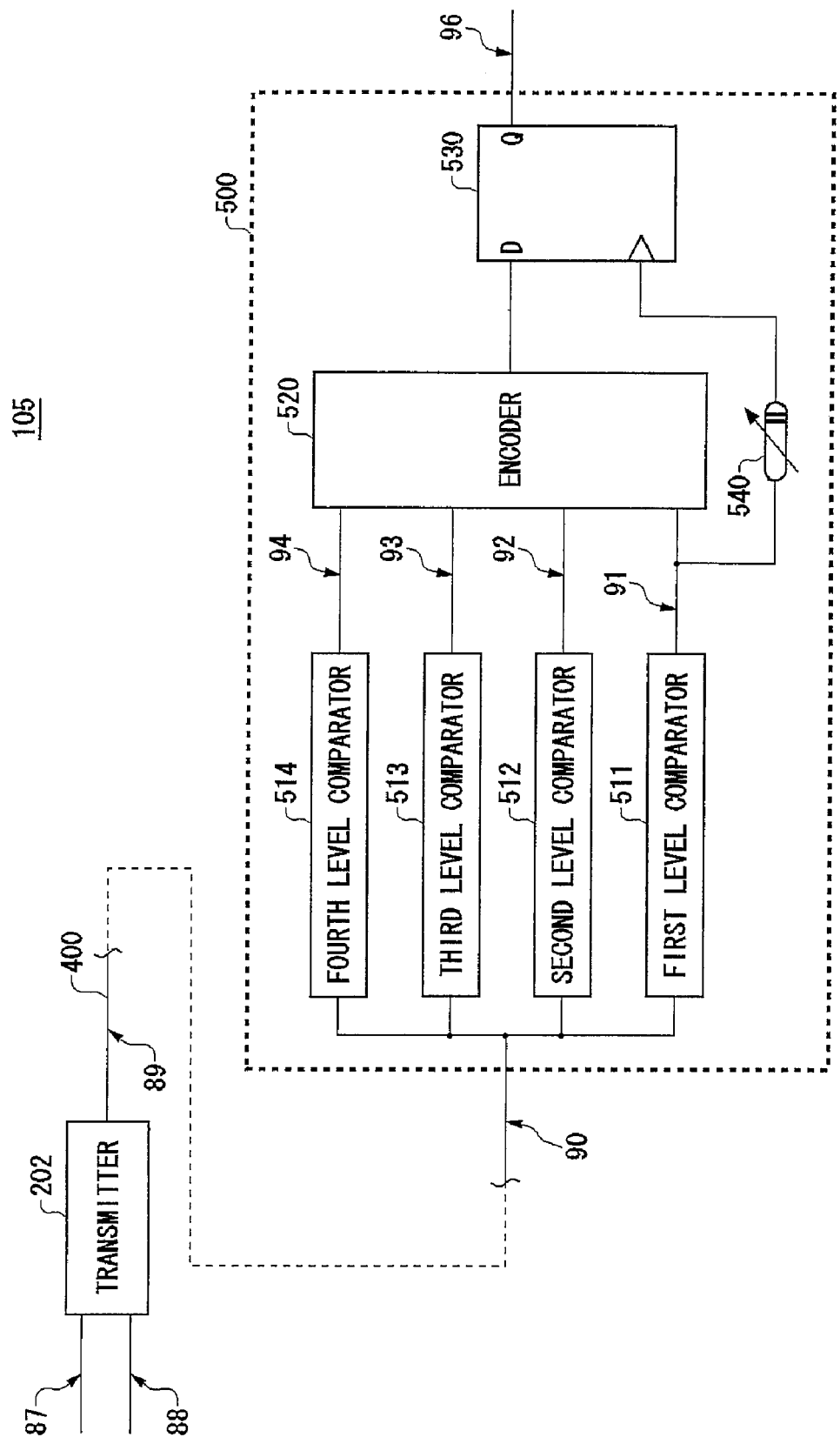
FIG. 12 illustrates an exemplary configuration of a transmission system 105 relating to another embodiment of the present invention.

FIG. 12 illustrates an exemplary configuration of a transmission system 105 relating to another embodiment of the present invention. The transmission system 105 is a system in which a data sequence including data values each is expressed by one of a plurality of values is transmitted. The transmission system 105 includes therein a transmitter 202 and a receiver 500 connected to each other by means of the transmission path 400. The transmitter 202 generates a transmission signal by converting each of the pieces of data making up an input data sequence into a data waveform which has a level signal whose signal level is determined by the value of the data and a timing edge indicating a timing to obtain the level signal, and transmits the generated transmission signal to the receiver 500 via the transmission path 400. The following describes the operation of the transmitter 202 in detail.

Figure 13:
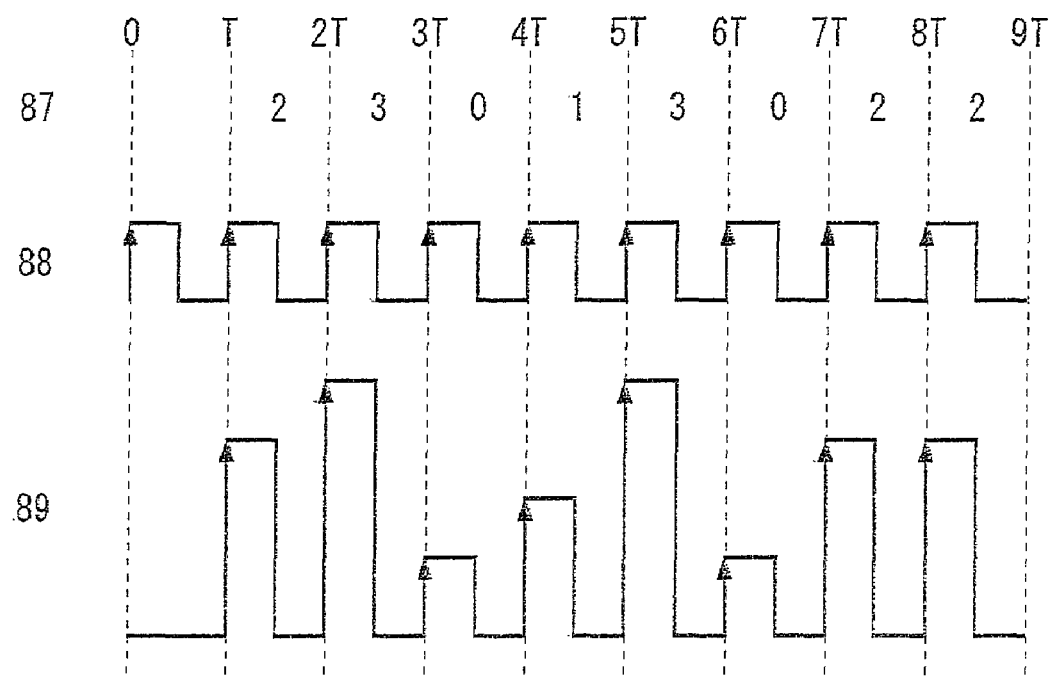
FIG. 13 is a timing chart illustrating an exemplary operation of a transmitter 202 included in the transmission system 105.

FIG. 13 is a timing chart illustrating an exemplary operation of the transmitter 202 included in the transmission system 105. Here, a data sequence 87 (23013022) is expressed by using four numbers from 0 to 3, and a transmission clock 88 is a clock signal which has the rising edges at the timings 0, T, 2T, 3T, 4T, . . . (that is to say, at the repetition period of T).

When receiving each piece of data of the data sequence 87 sequentially at the repetition period of T from the time T and the transmission clock 88, the transmitter 202 sequentially obtains each of the pieces of data making up the data sequence 87 at the repetition period of T, at an interval equal to the repetition period of the transmission clock 88.

The transmitter 202 transmits the obtained data sequence 87, in the form of a transmission signal 89, to the receiver 500. Here, the transmission signal 89 is made up by pulses each of which has a signal level determined by a corresponding one of the pieces of data included in the data sequence 87, and has a pulse waveform with a constant repetition period that is the same as the repetition period of the transmission clock 88. To be specific, each of the pieces of data of the data sequence 87 is sequentially input into the transmitter 202 at the constant repetition period of T from the time T, and when the input data has a value of 0, the transmitter 202 converts the input data into a pulse which at least has a rising timing edge and whose signal level is higher than a level "$V_{th3}$" but lower than a level "$V_{th4}$" (the levels $V_{th3}$ and $V_{th4}$ are mentioned later).

When the input data has a value of 1, the transmitter 202 converts the input data into a pulse which at least has a rising timing edge and whose signal level is higher than the level "$V_{th4}$" but lower than a level "$V_{th5}$" (the level $V_{th5}$ is mentioned later). When the input data has a value of 2, the transmitter 202 converts the input data into a pulse which at least has a rising timing edge and whose signal level is higher than the level "$V_{th5}$" but lower than a level "$V_{th6}$" (the level $V_{th6}$ is mentioned later). When the input data has a value of 3, the transmitter 202 converts the input data into a pulse which at least has a rising timing edge and whose signal level is higher than the level "$V_{th6}$". Based on the pulses generated by the above conversions, the transmitter 202 generates the transmission signal 89 which has a pulse waveform with a constant repetition period of T, and outputs the generated transmission signal 89.

Here, the above-mentioned timing edge indicates a timing to obtain the level signal of each pulse of the transmission signal 89. Each pulse of the transmission signal 89 varies from the reference level to the corresponding signal level at the timing edge, and then goes back to the reference level from the corresponding signal level, as shown in FIG. 13.

The receiver 500 includes therein a first level comparator 511, a second level comparator 512, a third level comparator 513, a fourth level comparator 514, an encoder 520, a signal obtaining section 530, and a delay circuit 540. In accordance with each of the data waveforms of the received transmission signal, the receiver 500 generates a data value corresponding to a signal level of the data waveform which is detected at the timing designated by the timing edge of the data waveform. Based on the data values generated in such a manner, the receiver 500 generates and outputs a regenerated data sequence which is the same as the data sequence input into the transmitter 202. The following describes the operation of the receiver 500 in detail.

Figure 14:
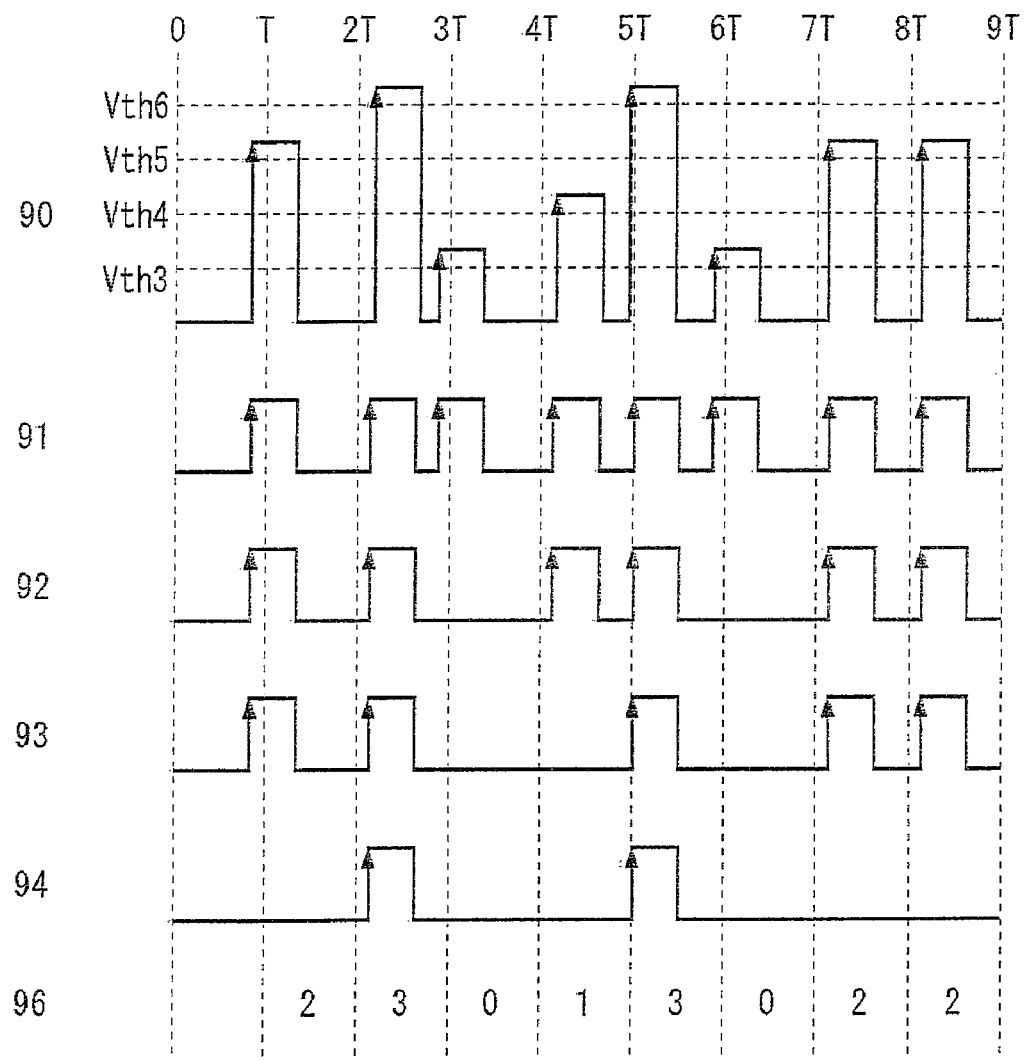
FIG. 14 is a timing chart illustrating an exemplary operation of a receiver 500 included in the transmission system 105.

FIG. 14 is a timing chart illustrating an exemplary operation of the receiver 500 included in the transmission system 105. The transmission signal 89 output from the transmitter 202 is changed into a transmission signal 90 during the transmission to the receiver 500 since jitter is injected to each pulse. The transmission signal 90 is input into the first level comparator 511, the second level comparator 512, the third level comparator 513, and the fourth level comparator 514 of the receiver 500. The number of the first to fourth level comparators 511 to 514 is determined so as to correspond to the number of data values (in this example, four data values) one of which can be selected for each of the pieces of data included in the data sequence 87 input into the transmitter 202. Each of the first to forth level comparators 511 to 514 outputs a detection signal when the signal level of each pulse of the transmission signal 90 is detected to be equal to or higher than a threshold value determined in accordance with the corresponding data value.

Specifically speaking, when detecting that the signal level of the input transmission signal 90 is higher than the level "$V_{th3}$", the first level comparator 511 outputs a first result signal 91 to the encoder 520. Here, the first result signal 91 has a binary pulse waveform whose signal level varies from the L level to the H level at the timing of the detection. Similarly, when respectively detecting that the signal level of the input transmission signal 90 is higher than the levels "$V_{th4}$", "$V_{th5}$", and "$V_{th6}$", the second, third and fourth level comparators 512, 513 and 514 respectively output a second result signal 92, a third result signal 93, and a fourth result signal 94 to the encoder 520. Here, the second to fourth result signals 92 to 94 each have a binary pulse waveform whose signal level varies from the L level to the H level at the timing of the detection.

Based on the first to fourth result signals 91 to 94 input thereto, the encoder 520 outputs a data sequence which is expressed by using four numbers (23013022) to the signal obtaining section 530. The signal obtaining section 530 obtains the data sequence received from the encoder 520 at the timings designated by the first result signal 91 output from the first level comparator 511. The signal obtaining section 530 also outputs, as a regenerated data sequence 96 (23013022), the obtained data sequence to a device external to the receiver 500. Here, the timing designated by the first result signal 91 indicates for example, a timing at which each pulse of the first result signal 91 rises.

As discussed in the above description of the transmission system 105, the transmitter 202 converts the input data sequence 87 which is expressed by using the four numbers of 0 to 3, into the transmission signal 89 having a pulse waveform which has a constant repetition period and is made up by pulses whose signal levels correspond to the pieces of data of the data sequence 87. The transmitter 202 transmits the transmission signal 89 to the receiver 500. Here, a case is assumed where the transmission signal 89 is changed into the transmission signal 90 during the transmission from the transmitter 202 to the receiver 500 since jitter is injected to the transmission signal 89. Even in this case, since the signal obtaining section 530 obtains the data sequence input thereto from the encoder 520 at the timings designated by the first result signal 91 each pulse of which has the same jitter as the corresponding one of the pulses of the transmission signal 90 whose signal levels are determined in accordance with the pieces of data of the data sequence 87, the signal obtaining section 530 can accurately detect the signal level of each period of the data sequence. Therefore, the receiver 500 can minimize the bit errors which may be caused by the jitter. As a result, the receiver 500 can accurately regenerate the regenerated data sequence 96 which is the same as the data sequence 87, based on the data value corresponding to the detected signal level of each period.

Note that the transmission path 400 in the transmission systems 100 to 105 may be a path for wired or wireless transmission.

While one aspect of the present invention has been described through the embodiments, the technical scope of the invention is not limited to the above described embodiments. It is apparent to persons skilled in the art that various alternations and improvements can be injected to the above-described embodiments. It is also apparent from the scope of the claims that the embodiments injected with such alternations or improvements can be included in the technical scope of the invention.

As is apparent from the above description, one embodiment of the present invention can realize a transmission system, a receiver, and a transmission method for transmitting serial data by using a clock signal.

What is claimed is:

1. A transmission system in which a data sequence is transmitted, comprising:
   a transmitter that generates a transmission signal by converting pieces of data included in the data sequence into a pulse waveform including a plurality of pulses each of which has (i) a level signal whose signal level is determined by a value of a corresponding one of the pieces of data and (ii) a timing edge indicating a timing to obtain the level signal and each of which varies from a reference level to the signal level at the timing edge and then goes back to the reference level from the signal level, and transmits the generated transmission signal; and
   a receiver including a plurality of level comparators that are provided in association with a plurality of data value candidates one of which is selected for each of the pieces of data included in the data sequence, each of the plurality of level comparators outputting a detection signal when the signal level is equal to or higher than a threshold value determined in accordance with an associated data value candidate,
   wherein the receiver detects the signal level of each of the plurality of pulses at a timing designated by the detection signal associated with a smallest data value candidate among the plurality of data value candidates, and outputs the data value corresponding to the detected signal level.

2. A transmission system in which a data sequence is transmitted, comprising:
   a transmitter that generates a transmission signal by converting pieces of binary data included in the data sequence into a pulse waveform including a plurality of pulses each of which has (i) a level signal whose signal level is determined by a value of a corresponding one of the pieces of data and (ii) a timing edge indicating a timing to obtain the level signal and each of which has a polarity determined by a value of a corresponding one of the pieces of binary data and varies from a reference level to the signal level at the timing edge and then goes back to the reference level from the signal level, and transmits the generated transmission signal; and
   a receiver that receives the transmission signal and detects the signal level of each of the plurality of pulses of the received transmission signal at the timing designated by the timing edge of the each pulse, and outputs a data value corresponding to the detected signal level,
   wherein the receiver includes:
   a positive pulse detecting section that detects a positive pulse from the received transmission signal, the positive pulse having the signal level on a positive side;
   a negative pulse detecting section that detects a negative pulse from the received transmission signal, the negative pulse having the signal level on a negative side; and
   a clock generating section that generates a reception clock based on the timing edge of the positive pulse detected by the positive pulse detecting section and the timing edge of the negative pulse detected by the negative pulse detecting section.

3. The transmission system as set forth in claim 2, including:

a frequency divider that obtains a frequency-divided signal by dividing, into half, a frequency of one of the positive pulse and the negative pulse, and outputs the obtained frequency-divided signal;

a signal obtaining section that obtains the frequency-divided signal at a timing designated by the reception clock; and a data regenerating section that regenerates the data sequence based on the frequency-divided signal obtained by the signal obtaining section.

4. The transmission system as set forth in claim 3, wherein
the frequency divider obtains the frequency-divided signal by dividing the frequency of the positive pulse into half, and outputs the obtained frequency-divided signal, and
the data regenerating section obtains a logical XOR between a logical value of the frequency-divided signal for a current cycle and a logical value of the frequency-divided signal for an immediately previous cycle, and sets the obtained logical XOR as a data value of the regenerated data sequence for the current cycle.

5. The transmission system as set forth in claim 3, wherein
the frequency divider obtains the frequency-divided signal by dividing the frequency of the negative pulse into half, and outputs the obtained frequency-divided signal, and
the data regenerating section obtains a negation of a logical XOR between a logical value of the frequency-divided signal for a current cycle and a logical value of the frequency-divided signal for an immediately previous cycle, and sets the obtained negation of the logical XOR as a data value of the regenerated data sequence for the current cycle.

6. The transmission system as set forth in claim 2, wherein the receiver includes:

a positive frequency divider that obtains a positive frequency-divided signal by dividing a frequency of the positive pulse into half and outputs the obtained positive frequency-divided signal; and a negative frequency divider that obtains a negative frequency-divided signal by dividing a frequency of the negative pulse into half and outputs the obtained negative frequency-divided signal, the clock generating section generates the reception clock by calculating a logical XOR between the positive and negative frequency-divided signals, and the receiver further includes:

a signal obtaining section that obtains one of the positive and negative frequency-divided signals at rising and falling edges of the reception clock; and a data regenerating section that regenerates the data sequence based on the frequency-divided signal obtained by the signal obtaining section.

7. The transmission system as set forth in claim 2, wherein the receiver includes an SR flip-flop that is set by the positive pulse detected by the positive pulse detecting section and reset by the negative pulse detected by the negative pulse detecting section, thereby outputting an SR signal.

8. The transmission system as set forth in claim 2, wherein the receiver includes:

a positive pulse obtaining section that obtains an output from the positive pulse detecting section at a timing designated by the reception clock;

a negative pulse obtaining section that obtains an output from the negative pulse detecting section at the timing designated by the reception clock; and a data regenerating section that regenerates a value of each of the pieces of data based on outputs from the positive and negative pulse obtaining sections.

9. The transmission system as set forth in claim 2, wherein
the receiver includes a positive pulse obtaining section that obtains an output from the positive pulse detecting section at a timing designated by the reception clock, and
the receiver outputs an output from the positive pulse obtaining section as a value of each of the pieces of data.

10. A transmission system in which a data sequence is transmitted, comprising:

a transmitter that generates a transmission signal by converting pieces of binary data included in the data sequence into a pulse waveform including a plurality of pulses each of which has (i) a level signal whose signal level is determined by a value of a corresponding one of the pieces of data and (ii) a timing edge indicating a timing to obtain the level signal and each of which has a polarity determined by a value of a corresponding one of the pieces of binary data and varies from a reference level to the signal level at the timing edge and then goes back to the reference level from the signal level, and transmits the generated transmission signal; and a receiver that receives the transmission signal and detects the signal level of each of the plurality of pulses of the received transmission signal at the timing designated by the timing edge of the each pulse, and outputs a data value corresponding to the detected signal level, wherein the transmitter obtains a converted data sequence by (i) adding data having a logical value of H at a start of the data sequence to transmit and (ii) calculating a logical XOR between a logical value of data of the data sequence for a current cycle and a logical value of data of the data sequence for an immediately previous cycle, converts each of pieces of data included in the obtained converted data sequence into a pulse having a polarity determined by a value of the each piece of data, and transmits the pulse, the receiver includes:

a positive pulse detecting section that detects a positive pulse from the received transmission signal, the positive pulse having the signal level on a positive side;

a negative pulse detecting section that detects a negative pulse from the received transmission signal, the negative pulse having the signal level on a negative side;

a clock generating section that generates a reception clock based on the timing edge of the positive pulse detected by the positive pulse detecting section and the timing edge of the negative pulse detected by the negative pulse detecting section;

a frequency divider that obtains a frequency-divided signal by dividing a frequency of one of the positive and negative pulses into half and outputs the obtained frequency-divided signal; and a signal obtaining section that obtains the frequency-divided signal at a timing designated by the reception clock, and the receiver outputs the frequency-divided signal obtained by the signal obtaining section as the data sequence.

11. A receiver that receives a transmission signal transmitted thereto, the transmission signal being generated by converting pieces of data included in a data sequence into a pulse waveform including a plurality of pulses each of which has (i) a level signal whose signal level is determined by a value of a corresponding one of the pieces of data and (ii) a timing edge indicating a timing to obtain the level signal and each of which varies from a reference level to the signal level at the timing edge and then goes back to the reference level from the signal level, wherein the receiver includes a plurality of level comparators that are provided in association with a plurality of data value candidates one of which is selected for each of the pieces of data included in the data sequence, each of the plurality of level comparators outputting a detection signal when the signal level is equal to or higher than a threshold value determined in accordance with an associated data value candidate, and the receiver detects the signal level of each of the plurality of pulses at a timing designated by the detection signal associated with a smallest data value candidate among the plurality of data value candidates, and outputs the data value corresponding to the detected signal level.

12. A transmission method for transmitting a data sequence, comprising:

transmitting a transmission signal which is generated by converting pieces of data included in the data sequence into a pulse waveform including a plurality of pulses each of which has (i) a level signal whose signal level is determined by a value of a corresponding one of the pieces of data and (ii) a timing edge indicating a timing to obtain the level signal and each of which varies from a reference level to the signal level at the timing edge and then goes back to the reference level from the signal level;

outputting one or more detection signals each corresponding to one of a plurality of data value candidates when the signal level is equal to or higher than a threshold value determined in accordance with the data value candidate; and detecting the signal level of each of the plurality of pulses at a timing designated by the detection signal associated with a smallest data value candidate among the plurality of data value candidates and outputting the data value corresponding to the detected signal level.

13. A receiver that receives a transmission signal transmitted thereto, the transmission signal being generated by converting pieces of binary data included in a data sequence into a pulse waveform including a plurality of pulses each of which has (i) a level signal whose signal level is determined by a value of a corresponding one of the pieces of data and (ii) a timing edge indicating a timing to obtain the level signal and each of which has a polarity determined by a value of a corresponding one of the pieces of binary data and varies from a reference level to the signal level at the timing edge and then goes back to the reference level from the signal level, wherein a receiver that detects the signal level of each of the plurality of pulses of the received transmission signal at the timing designated by the timing edge of the each pulse, and outputs a data value corresponding to the detected signal level, and the receiver includes:

a positive pulse detecting section that detects a positive pulse from the received transmission signal, the positive pulse having the signal level on a positive side;

a negative pulse detecting section that detects a negative pulse from the received transmission signal, the negative pulse having the signal level on a negative side; and a clock generating section that generates a reception clock based on the timing edge of the positive pulse detected by the positive pulse detecting section and the timing edge of the negative pulse detected by the negative pulse detecting section.

14. A transmission method for transmitting a data sequence, comprising:

transmitting a transmission signal which is generated by converting pieces of binary data included in the data sequence into a pulse waveform including a plurality of pulses each of which has (i) a level signal whose signal level is determined by a value of a corresponding one of the pieces of data and (ii) a timing edge indicating a timing to obtain the level signal and each of which has a polarity determined by a value of a corresponding one of the pieces of binary data and varies from a reference level to the signal level at the timing edge and then goes back to the reference level from the signal level;

receiving the transmission signal and detecting the signal level of each of the plurality of pulses of the received transmission signal at the timing designated by the timing edge of the each pulse, and outputting a data value corresponding to the detected signal level, said detecting including:

detecting a positive pulse from the received transmission signal, the positive pulse having the signal level on a positive side;

detecting a negative pulse from the received transmission signal, the negative pulse having the signal level on a negative side; and generating a reception clock based on the timing edge of the detected positive pulse and the timing edge of the detected negative pulse.

15. A receiver that receives a transmission signal transmitted thereto, the transmission signal being generated by converting pieces of binary data included in a data sequence into a pulse waveform including a plurality of pulses each of which has (i) a level signal whose signal level is determined by a value of a corresponding one of the pieces of data and (ii) a timing edge indicating a timing to obtain the level signal and each of which has a polarity determined by a value of a corresponding one of the pieces of binary data and varies from a reference level to the signal level at the timing edge and then goes back to the reference level from the signal level, the converted data sequence being obtained by (i) adding data having a logical value of H at a start of the data sequence to transmit and (ii) calculating a logical XOR between a logical value of data of the data sequence for a current cycle and a logical value of data of the data sequence for an immediately previous cycle, wherein the receiver detects the signal level of each of the plurality of pulses of the received transmission signal at the timing designated by the timing edge of the each pulse, and outputs a data value corresponding to the detected signal level, the receiver includes:

a positive pulse detecting section that detects a positive pulse from the received transmission signal, the positive pulse having the signal level on a positive side;

a negative pulse detecting section that detects a negative pulse from the received transmission signal, the negative pulse having the signal level on a negative side;

a clock generating section that generates a reception clock based on the timing edge of the positive pulse detected by the positive pulse detecting section and the timing edge of the negative pulse detected by the negative pulse detecting section;

a frequency divider that obtains a frequency-divided signal by dividing a frequency of one of the positive and negative pulses into half and outputs the obtained frequency-divided signal; and a signal obtaining section that obtains the frequency-divided signal at a timing designated by the reception clock, and the receiver outputs the frequency-divided signal obtained by the signal obtaining section as the data sequence.

16. A transmission method for transmitting a data sequence, comprising:

transmitting a transmission signal which is generated by converting pieces of binary data included in the data sequence into a pulse waveform including a plurality of pulses each of which has (i) a level signal whose signal level is determined by a value of a corresponding one of the pieces of data and (ii) a timing edge indicating a timing to obtain the level signal and each of which has a polarity determined by a value of a corresponding one of the pieces of binary data and varies from a reference level to the signal level at the timing edge and then goes back to the reference level from the signal level, the converted data sequence being obtained by (i) adding data having a logical value of H at a start of the data sequence to transmit and (ii) calculating a logical XOR between a logical value of data of the data sequence for a current cycle and a logical value of data of the data sequence for an immediately previous cycle;

receiving the transmission signal and detecting the signal level of each of the plurality of pulses of the received transmission signal at the timing designated by the timing edge of the each pulse, and outputting a data value corresponding to the detected signal level, said detecting including:

detecting a positive pulse from the received transmission signal, the positive pulse having the signal level on a positive side;

detecting a negative pulse from the received transmission signal, the negative pulse having the signal level on a negative side;

generating a reception clock based on the timing edge of the detected and the timing edge of the detected negative pulse;

obtaining a frequency-divided signal by dividing a frequency of one of the positive and negative pulses into half and outputting the obtained frequency-divided signal; and obtaining the frequency-divided signal at a timing designated by the reception clock; and outputting the frequency-divided signal obtained at the timing designated by the reception clock as the data sequence.

* * * * *